US012772070B2

(12) United States Patent
Tarasov

(10) Patent No.: US 12,772,070 B2
(45) Date of Patent: Oct. 20, 2026

(54) AUTOMATED WIRELESS ROUTER POSITIONING SYSTEM

(71) Applicant: Charter Communications Operating, LLC, St. Louis, MO (US)

(72) Inventor: Alex Tarasov, Centennial, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 267 days.

(21) Appl. No.: 18/664,717

(22) Filed: May 15, 2024

(65) Prior Publication Data

US 2025/0358635 A1 Nov. 20, 2025

(51) Int. Cl.
*H04W 16/20* (2009.01)
*H01Q 3/02* (2006.01)

(52) U.S. Cl.
CPC .............. *H04W 16/20* (2013.01); *H01Q 3/02* (2013.01)

(58) Field of Classification Search
CPC ....... H04W 16/20; H01Q 3/02; H01Q 1/1257; H01Q 1/2291
See application file for complete search history.

(56) References Cited

U.S. PATENT DOCUMENTS

| | | | | |
|---|---|---|---|---|
| 9,769,767 | B1 * | 9/2017 | Jorgovanovic | H04W 52/243 |
| 11,279,480 | B1 * | 3/2022 | Rezvani | B64C 39/024 |
| 2012/0196545 | A1 * | 8/2012 | Schmidt | H01Q 1/246 342/368 |
| 2014/0105373 | A1 * | 4/2014 | Sharpe | H04M 3/38 379/142.05 |
| 2015/0094104 | A1 * | 4/2015 | Wilmhoff | H01Q 19/10 343/834 |
| 2018/0352443 | A1 * | 12/2018 | Hwang | H04W 40/20 |
| 2019/0261007 | A1 * | 8/2019 | Emmanuel | H04N 19/166 |
| 2019/0289481 | A1 * | 9/2019 | Qvarfordt | H04W 24/08 |
| 2022/0095120 | A1 * | 3/2022 | Panje | H04W 16/18 |
| 2022/0164997 | A1 * | 5/2022 | Mantri | G06T 11/00 |
| 2023/0131370 | A1 * | 4/2023 | Gorski | A01K 29/005 340/573.1 |
| 2023/0359851 | A1 * | 11/2023 | Volkerink | G06Q 10/0832 |
| 2025/0212010 | A1 * | 6/2025 | Ahmed | H04W 24/08 |

* cited by examiner

*Primary Examiner* — Christine Ng
(74) *Attorney, Agent, or Firm* — Young Basile Hanlon & MacFarlane, P.C.

(57) ABSTRACT

Methods and systems for automated positioning of a wireless router in a premises. The method includes placing a slidable wireless router device on a linear rail attached to a wall, initiating, by a wireless router in the slidable wireless router device, a search cycle for a determined event, obtaining, by the wireless router from connected devices, signal connectivity measurements from a starting point on the linear rail, obtaining, by the wireless router from the connected devices, additional signal connectivity measurements by incrementally moving the slidable wireless router device over remaining points on the linear rail, and moving, by a controller in the slidable wireless router device, the slidable wireless router device to an optimal position on the linear rail based on the signal connectivity measurements and the additional signal connectivity measurements.

20 Claims, 14 Drawing Sheets

AUTOMATED WIRELESS ROUTER POSITIONING SYSTEM

TECHNICAL FIELD

This disclosure relates to wireless routers. More specifically, this disclosure relates to a wireless router that can automatically and intelligently position itself to optimize wireless coverage.

BACKGROUND

A wireless router or Wi-Fi router is a device that functionally performs as a router and a wireless access point. Devices can connect to the wireless router wirelessly if they are within a wireless coverage area of the wireless router, connect via a wired connection, and/or combinations thereof. The wireless router can establish a wireless local area network (WLAN) at a premises which enables the connected devices to share files and use peripheral devices. The wireless router can provide access to the Internet when connected to a modem or simply perform as private computer network.

The placement of the wireless router in the premises can be problematic as the wireless coverage is subjected to interference caused by reflections, has dead spots, and/or other related issues (collectively "wireless connectivity issues"). These wireless connectivity issues are likely to be different for each device connected to the wireless router. Adjusting the position of the wireless router for one device may affect wireless connectivity for another device. Small changes in the position of the wireless router position can translate to increased or different wireless connectivity issues.

SUMMARY

Disclosed herein is a system and method for automated positioning of a WiFi router in a premises. In implementations, a method for automated wireless router positioning includes placing a slidable wireless router device on a linear rail attached to a wall, initiating, by a wireless router in the slidable wireless router device, a search cycle for a determined event, obtaining, by the wireless router from connected devices, signal connectivity measurements from a starting point on the linear rail, obtaining, by the wireless router from the connected devices, additional signal connectivity measurements by incrementally moving the slidable wireless router device over remaining points on the linear rail, and moving, by a controller in the slidable wireless router device, the slidable wireless router device to an optimal position on the linear rail based on the signal connectivity measurements and the additional signal connectivity measurements.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
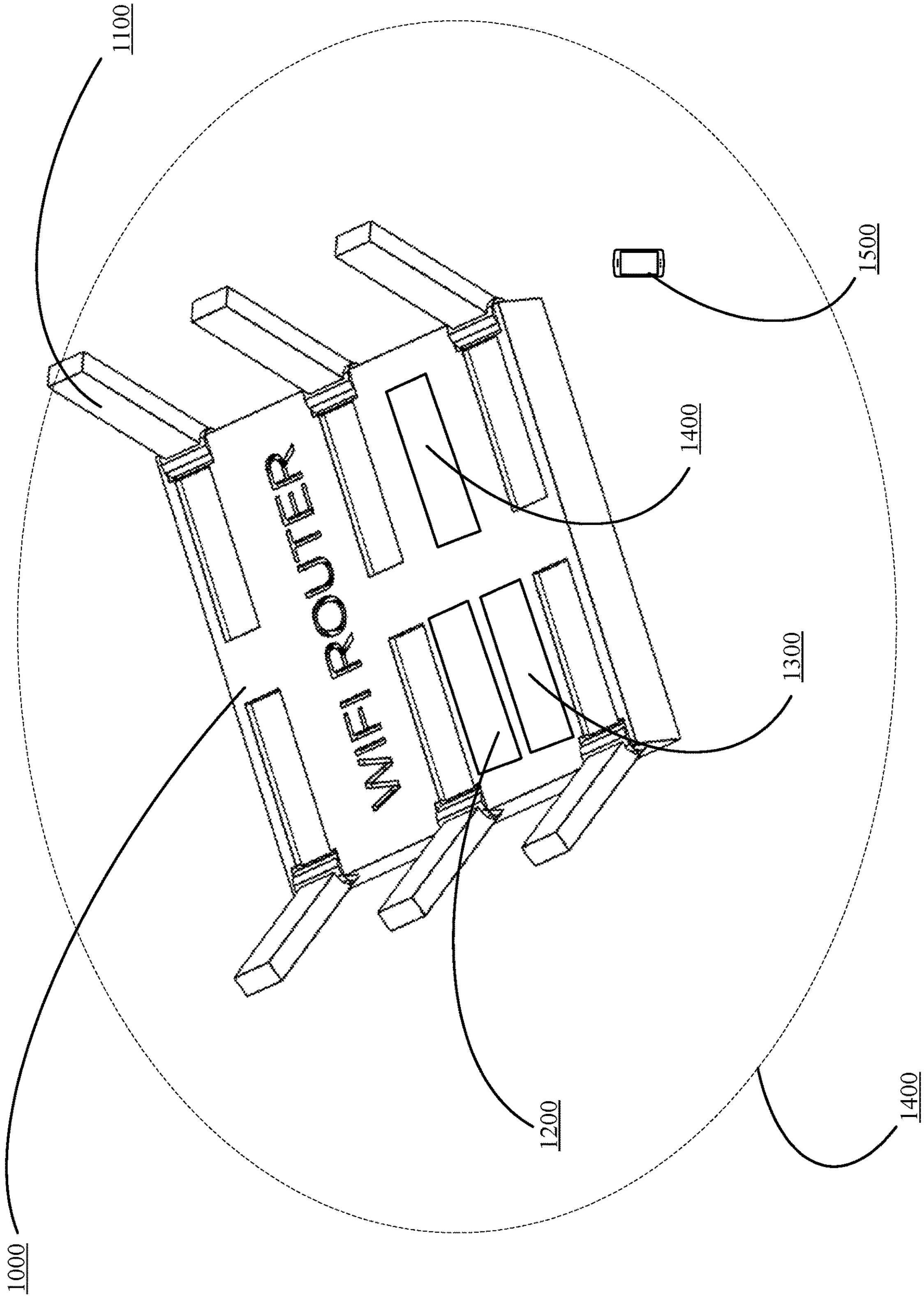
FIG. 1 is a diagram of an example of a wireless router in accordance with embodiments of this disclosure.

Reference will now be made in greater detail to embodiments, examples of which are illustrated in the accompanying drawings. Wherever possible, the same reference numerals will be used throughout the drawings and the description to refer to the same or like parts.

As used herein, the terminology "server", "computer", "computing device or platform", or "cloud computing system" includes any unit, or combination of units, capable of performing any method, or any portion or portions thereof, disclosed herein. For example, the "server", "computer", "computing device or platform", or "cloud computing system" may include at least one or more processor(s).

As used herein, the terminology "processor" or "processing circuitry" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory and hardware that is hard-wired into the processing circuitry.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the term "memory" includes one or more memories, where each memory may be a computer-readable medium. A memory may encompass memory hardware units (e.g., a hard drive or a disk) that store data or instructions in software form. Alternatively or in addition, the memory may include data or instructions that are hard-wired into processing circuitry. The memory may include a single memory unit or multiple joint or disjoint memory units, which each of the multiple joint or disjoint memory units storing all or a portion of the data described as being stored in the memory.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, scheduling, management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure and claims. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein is a system and method for automated wireless router positioning. In implementations, an automated wireless router system can intelligently position itself to provide optimal wireless coverage to devices in a premises. In implementations, the automated wireless router system enables moving a wireless router on a linear rail or linear rod mounted to a wall in a premises. The wireless router obtains wireless connectivity measurements from connected devices as the wireless router moves across or on the linear rail. In implementations, the wireless connectivity measurements can include packet loss measurements, received signal strength indicator (RSSI) measurements, and/or similar signal connectivity measurements or data.

The wireless router can then move to the position on the linear rail that provides the optimal wireless connectivity for the connected devices. In implementations, certain of the connected devices may be designated as subscriber or whitelist devices and other devices as guest devices or blacklist devices. In this instance, the wireless router can then move to the position on the linear rail that provides the optimal wireless connectivity for the whitelisted connected devices.

In implementations, the automated wireless router system can include a linear rail attached to a wall at a premises. A pair of sliders can be moveably or slidably attached to the linear rail. A mounting bracket can be attached to the pair of sliders. A stepper motor with a moving mechanism can be attached to the mounting bracket. Advantageously, the stepper motor does not need any closed loop feedback to get exact positioning. In implementations, the moving mechanism can be a rubber wheel mounted or attached to the stepper motor. In implementations, the stepper motor with the moving mechanism can be belt driven system. The wireless router can be mounted to the mounting bracket. The rubber wheel can be made to move by the stepper motor and rub against the wall or against the linear rail. This can allow the wireless router to freely position itself on its axis of motion. That is, the wireless router can move in one axis along a wall to seek a position that has the best wireless coverage for all of the connected devices or a designated set of the connected devices. In this manner, the automated wireless router system can automatically minimize interference caused by reflections and eliminate dead spots in the wireless coverage. The premise is that small changes in wireless router position can cause a big difference in eliminating dead spots.

FIG. 1 is a diagram of an example of a wireless router 1000 in accordance with embodiments of this disclosure. The wireless router 1000 can be, but is not limited to, a WiFi router, a wireless router, an integrated wireless router and modem, and/or any wireless device which can provide wireless coverage in a premises (collectively "wireless router"). In implementations, the wireless router 1000 can include antennae 1100, a controller 1200, and a memory 1300.

In implementations, the wireless router 1000 and the antennae 1100 can provide a wireless coverage 1400. Devices 1500, such as but not limited to, mobile device(s), smartphone(s), customer premises equipment, laptop(s), computing device(s), set-top box(es), personal computers (PCs), cellular telephones, Internet Protocol (IP) device(s), computers, desktop computer(s), handheld computer(s), personal media device(s), notebook(s), notepad(s), smart televisions, and/or combinations thereof which are in the wireless coverage 1400 can connect to the wireless router 1000. In implementations, the wireless router 1000 can include battery power 1600.

In implementations, the wireless router 1000 and/or the controller 1200 is electrically connected to a stepper motor as described herein. The controller 1200 can control the actions of the stepper motor, which in turn can control a moving mechanism to move the wireless router 1000 along a linear rail as described herein.

Figure 2:
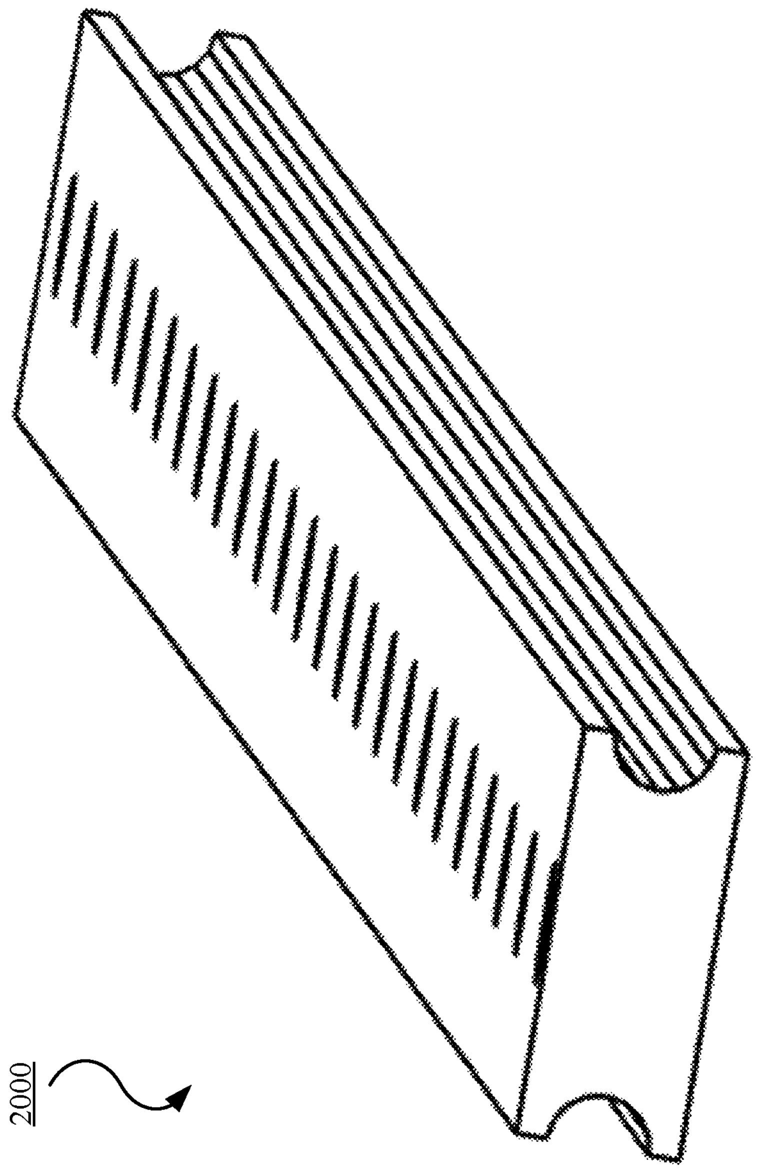
FIG. 2 is a diagram of an example of a linear rail in accordance with embodiments of this disclosure.

FIG. 2 is a diagram of an example of a linear rail 2000 in accordance with embodiments of this disclosure. The linear rail 2000 can be made from, but not limited to, metals, plastics, and/or any suitable materials. The term linear rail as used herein includes linear rods, and/or other suitable devices. In implementations, the linear rail can include end stops at each end. The shape, size, and form of the linear rail 2000 can be made as appropriate for a wall in a premises.

Figure 3:
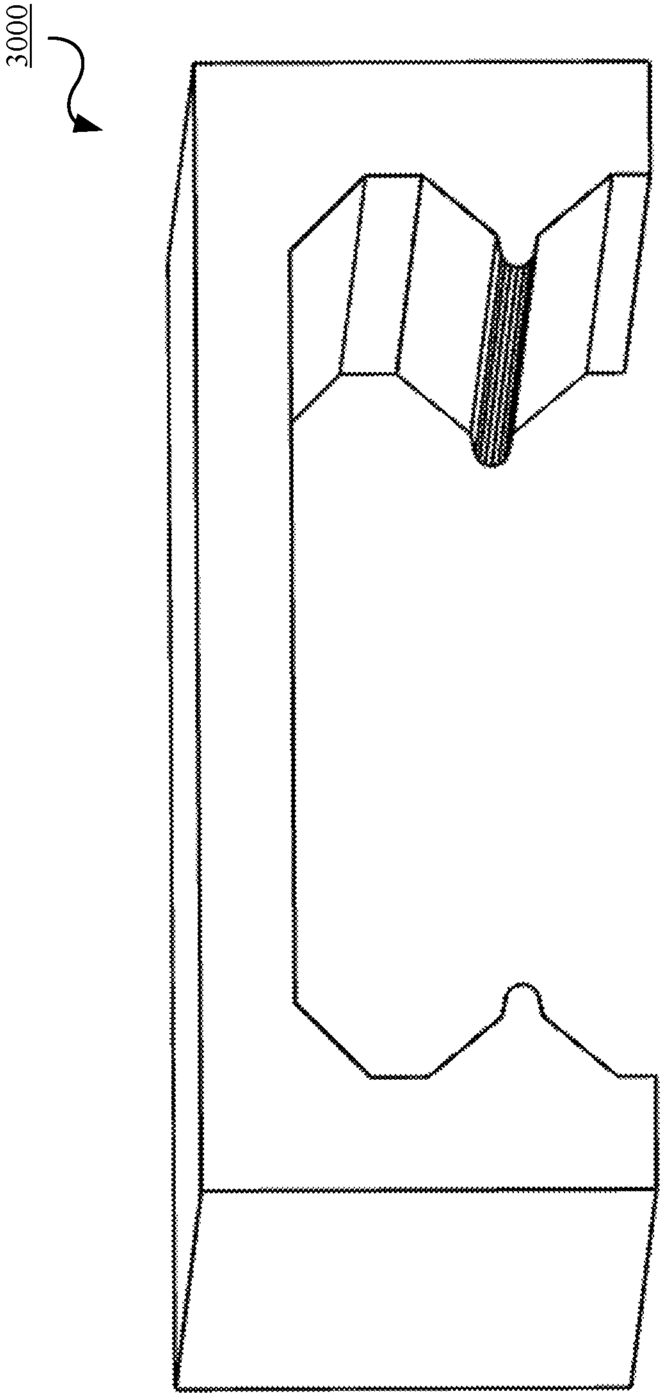
FIG. 3 is a diagram of an example of a slider for use with the linear rail of FIG. 2 in accordance with embodiments of this disclosure.

FIG. 3 is a diagram of an example of a slider 3000 for use with the linear rail 2000 of FIG. 2 in accordance with embodiments of this disclosure. A pair of sliders 3000 are used cooperatively with the linear rail 2000, where smooth sliding can be provided by an inside linear bearing. The shape, size, and form of the slider 3000 can be made as appropriate for the linear rail 2000. The slider 3000 can be made from, but not limited to, metals, plastics, and/or any suitable materials.

Figure 4:
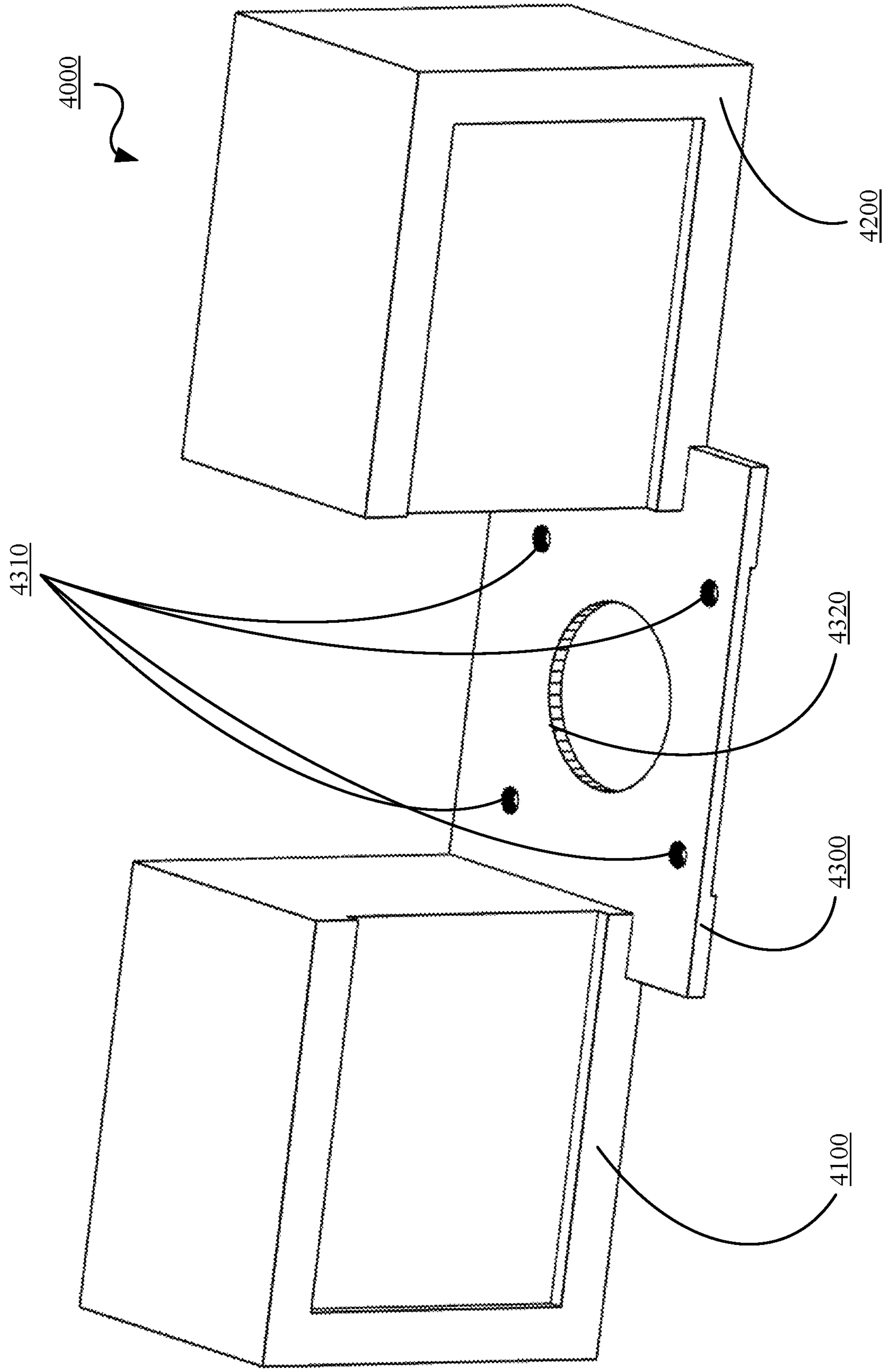
FIG. 4 is a diagram of an example of a mounting bracket for use with a pair of sliders as shown in FIG. 3 in accordance with embodiments of this disclosure.

FIG. 4 is a diagram of an example of a mounting bracket 4000 for use with a pair of sliders 3000 as shown in FIG. 3 in accordance with embodiments of this disclosure. The mounting bracket 4000 can include a pair of slider mounting brackets 4100 and 4200 connected together via a stepper motor mounting section 4300. Each of the pair of slider mounting brackets 4100 and 4200 can include a slider engagement section 4110 and 4210, respectively, for cooperative engagement with the pair of sliders 3000, respectively. The stepper motor mounting section 4300 can include mounting holes or apertures 4310 for attaching a stepper motor as described herein. The stepper motor mounting section 4300 can also include an aperture 4320 for placement of a moving mechanism as described herein. The mounting bracket 4000 can be made from, but not limited to, metals, plastics, and/or any suitable materials.

Figure 5:
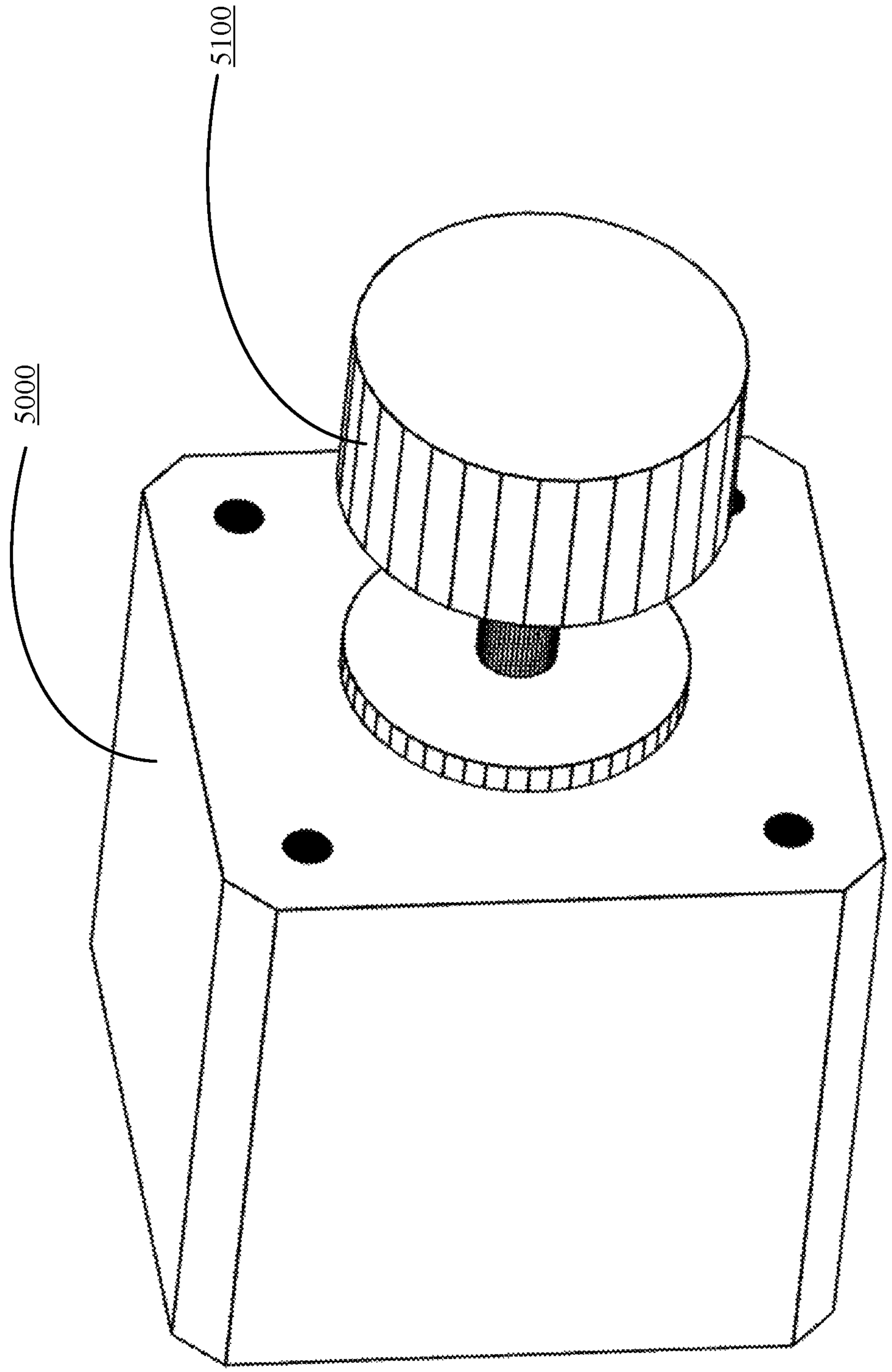
FIG. 5 is a diagram of an example of a stepper motor with a rubber wheel for use with the mounting bracket as shown in FIG. 4 in accordance with embodiments of this disclosure.

FIG. 5 is a diagram of an example of a stepper motor 5000 with a rubber wheel 5100 for use with the mounting bracket 4000 as shown in FIG. 4 in accordance with embodiments of this disclosure. In this instance, the moving mechanism is the rubber wheel 5100. The stepper motor 5000 can be any type of electrical motor that rotates in a series of small angular and/or discrete steps. The controller 1200 can be connected to the stepper motor 5000 to control and/or command the stepper motor 5000 to move and hold at one of these steps without any position sensor for feedback (e.g., an open-loop controller). The stepper motor 5000 and the rubber wheel 5100 are configured for size, torque, and speed with respect to the linear rail 2000 and operation and functionality of the wireless router 1000. In implementations, any appropriate type of digital actuator can be used, where a stepper motor is an example thereof. The rubber wheel 5100 is connected to the stepper motor 5000. The rubber wheel 5100 can be placed within the aperture 4320 of FIG. 4 such that the rubber wheel 5100 can rotate against the linear rail 2000. In implementations, the stepper motor 5000 and the rubber wheel 5100 can be integrated with the wireless router 1000.

Figure 6:
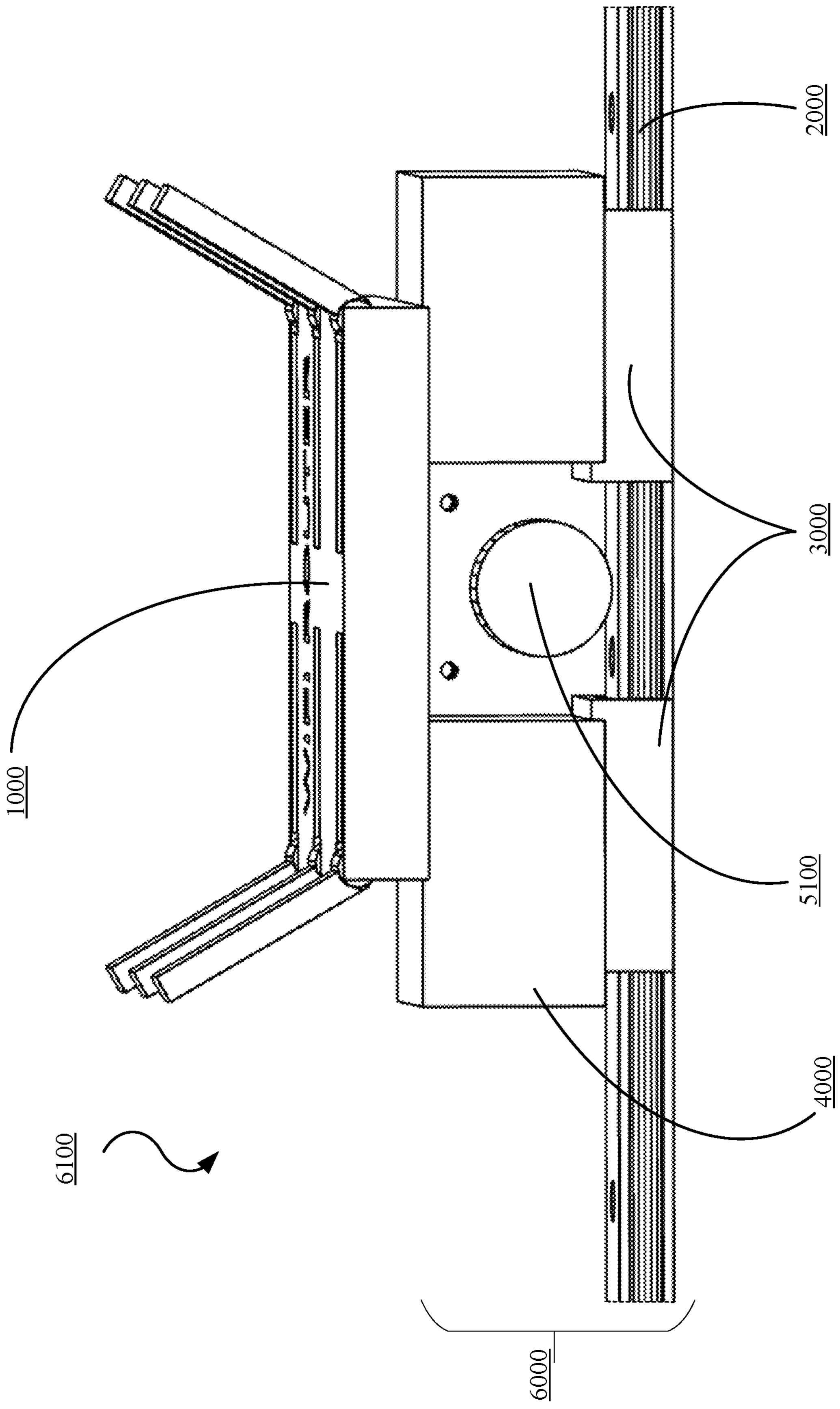
FIG. 6 is a diagram of an example of the wireless router of FIG. 1 for use with the mounting bracket as shown in FIG. 4, the stepper motor with a rubber wheel as shown in FIG. 5, the slider as shown in FIG. 3, and the linear rail as shown in FIG. 2 in accordance with embodiments of this disclosure.

FIG. 6 is a diagram of an example of the wireless router 1000 of FIG. 1 for use with the mounting bracket 4000 as shown in FIG. 4, the stepper motor 5000 with the rubber wheel 5100 as shown in FIG. 5, the slider 3000 as shown in FIG. 3, and the linear rail 2000 as shown in FIG. 2 (collectively "automated position optimization system or device 6000") (together "assembled device 6100") in accordance with embodiments of this disclosure. The mounting bracket 4000 as shown in FIG. 4, the stepper motor 5000 with the rubber wheel 5100 as shown in FIG. 5, and the slider 3000 can be termed a slidable mechanism or device.

Figure 7:
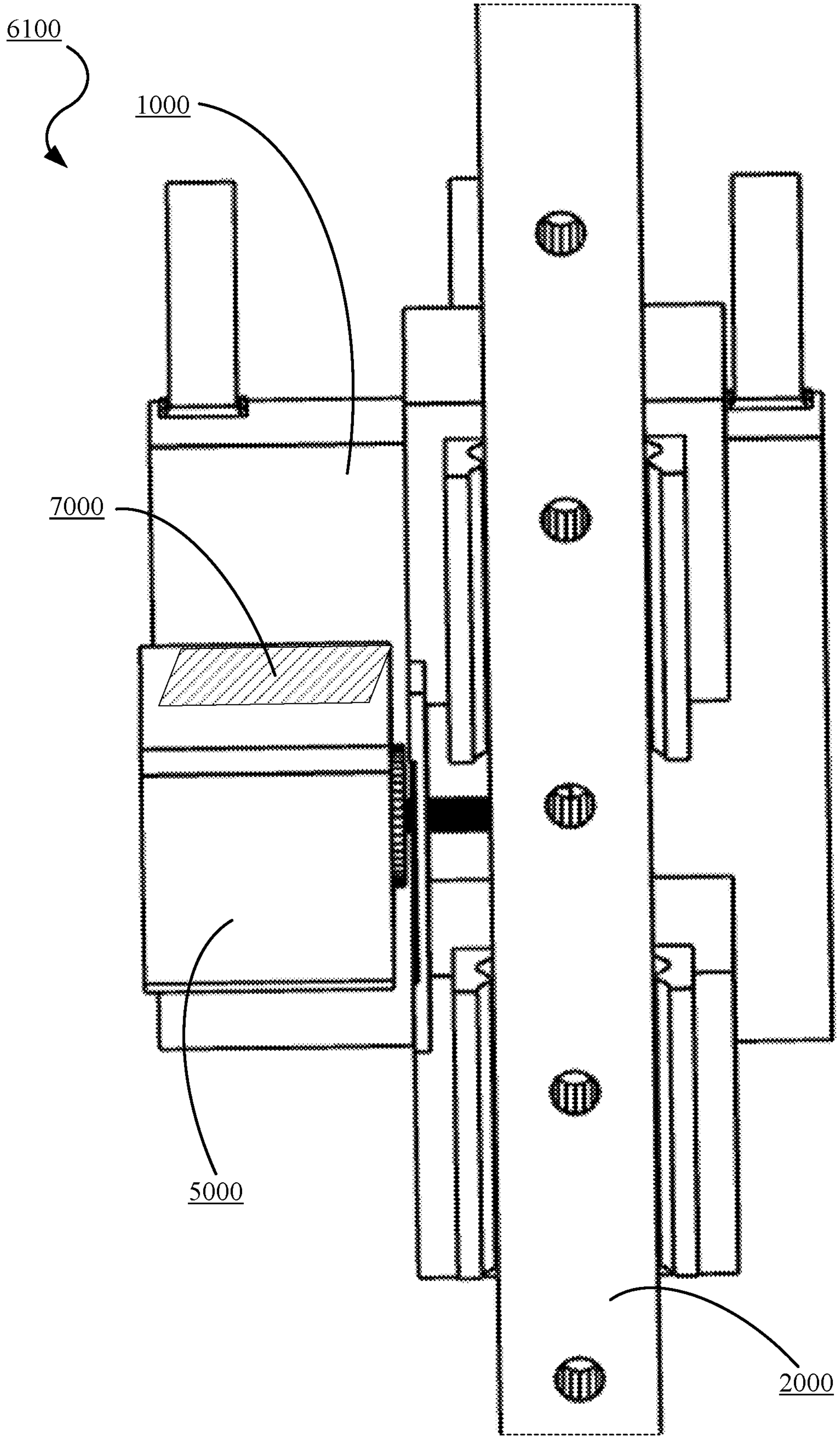
FIG. 7 is a perspective view of the assembled device of FIG. 6 in accordance with embodiments of this disclosure.

FIG. 7 is a perspective view of the assembled device 6100 of FIG. 6 in accordance with embodiments of this disclosure. Electrical connections 7000 between the stepper motor 5000 and the wireless router 1000 are shown via a block diagram.

Figure 8:
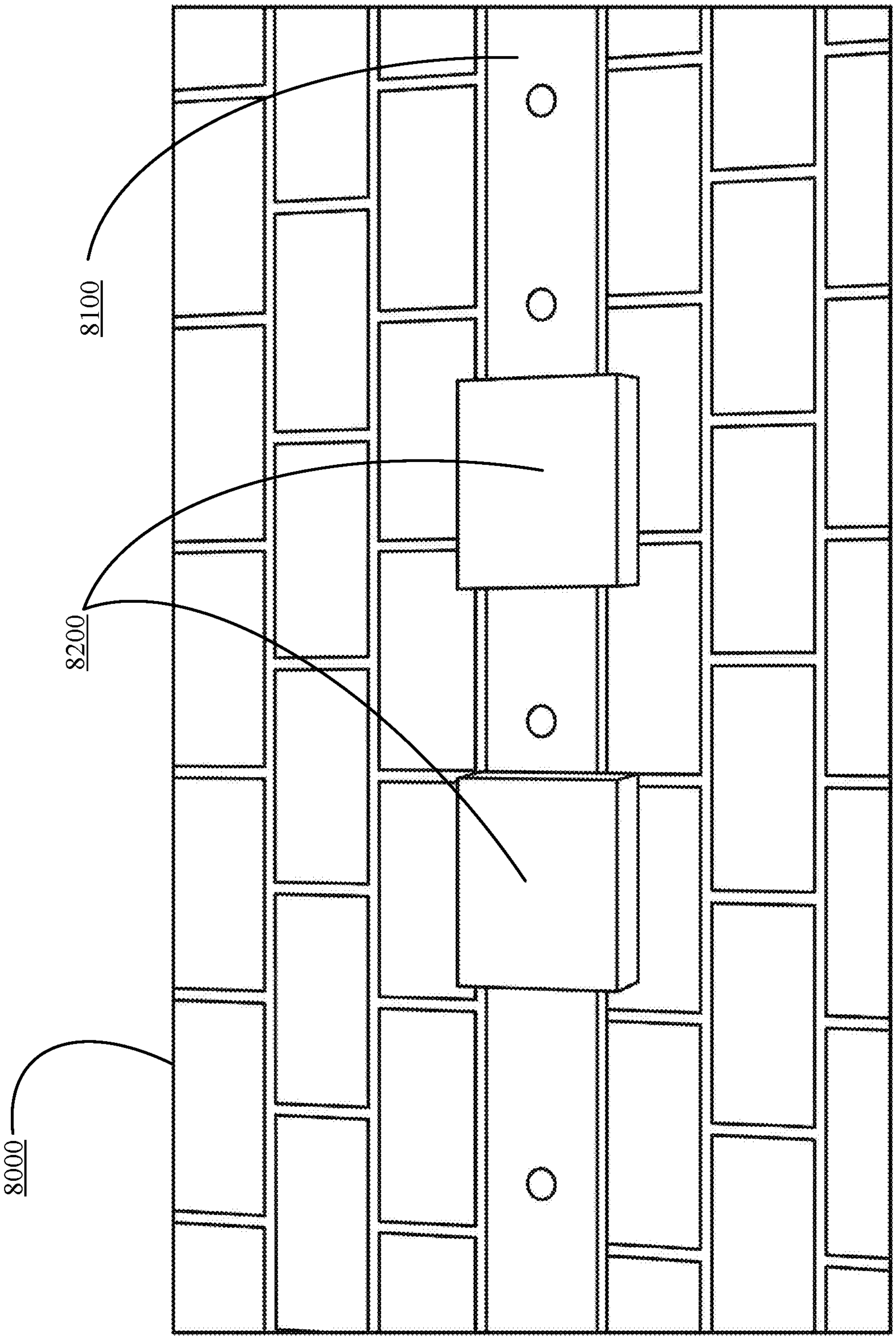
FIG. 8 is a diagram of an example of a linear rail with sliders mounted to a wall in a premises in accordance with embodiments of this disclosure.
Figure 9:
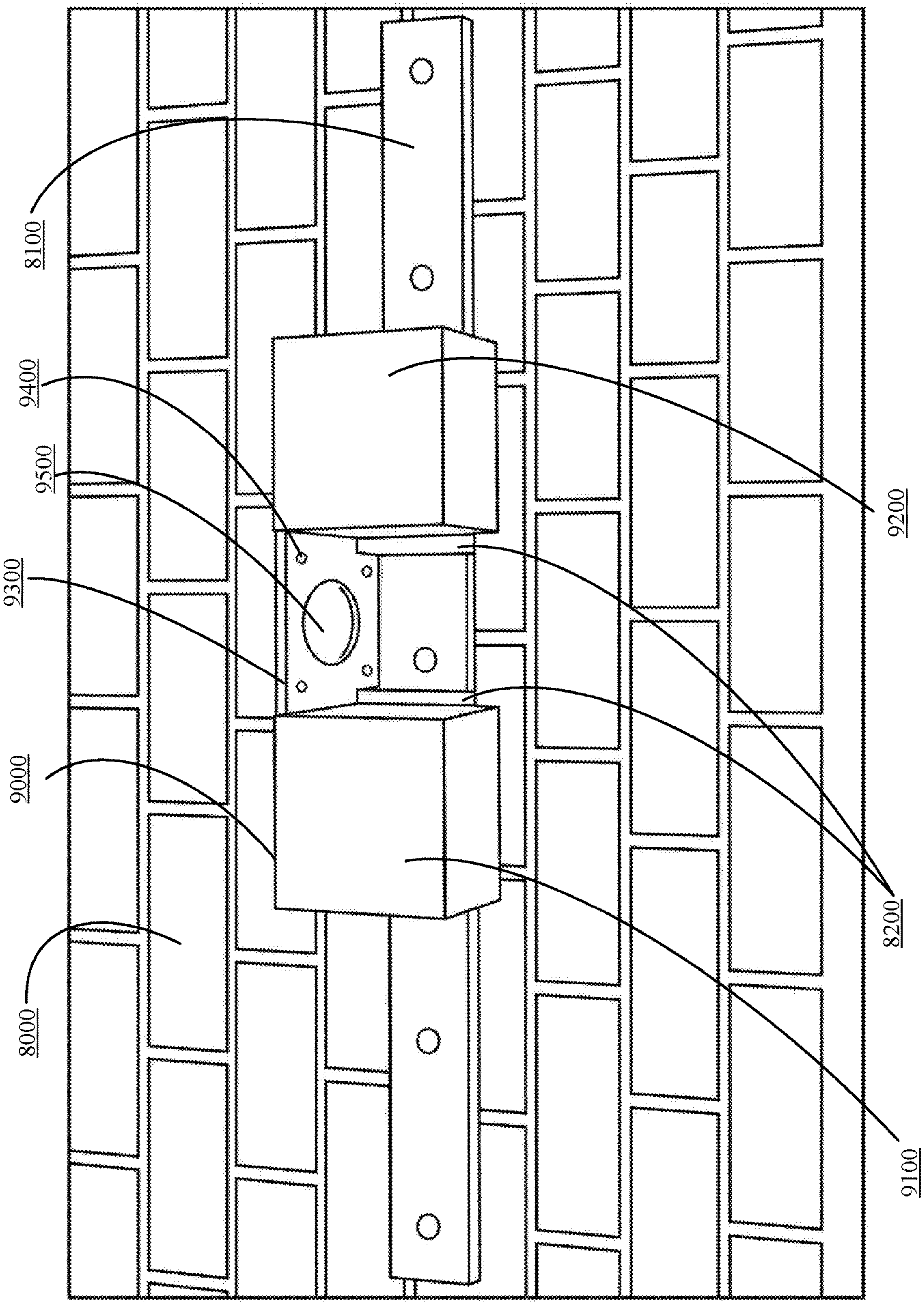
FIG. 9 is a diagram of an example of a mounting bracket mounted to the sliders of FIG. 8 in accordance with embodiments of this disclosure.
Figure 10:
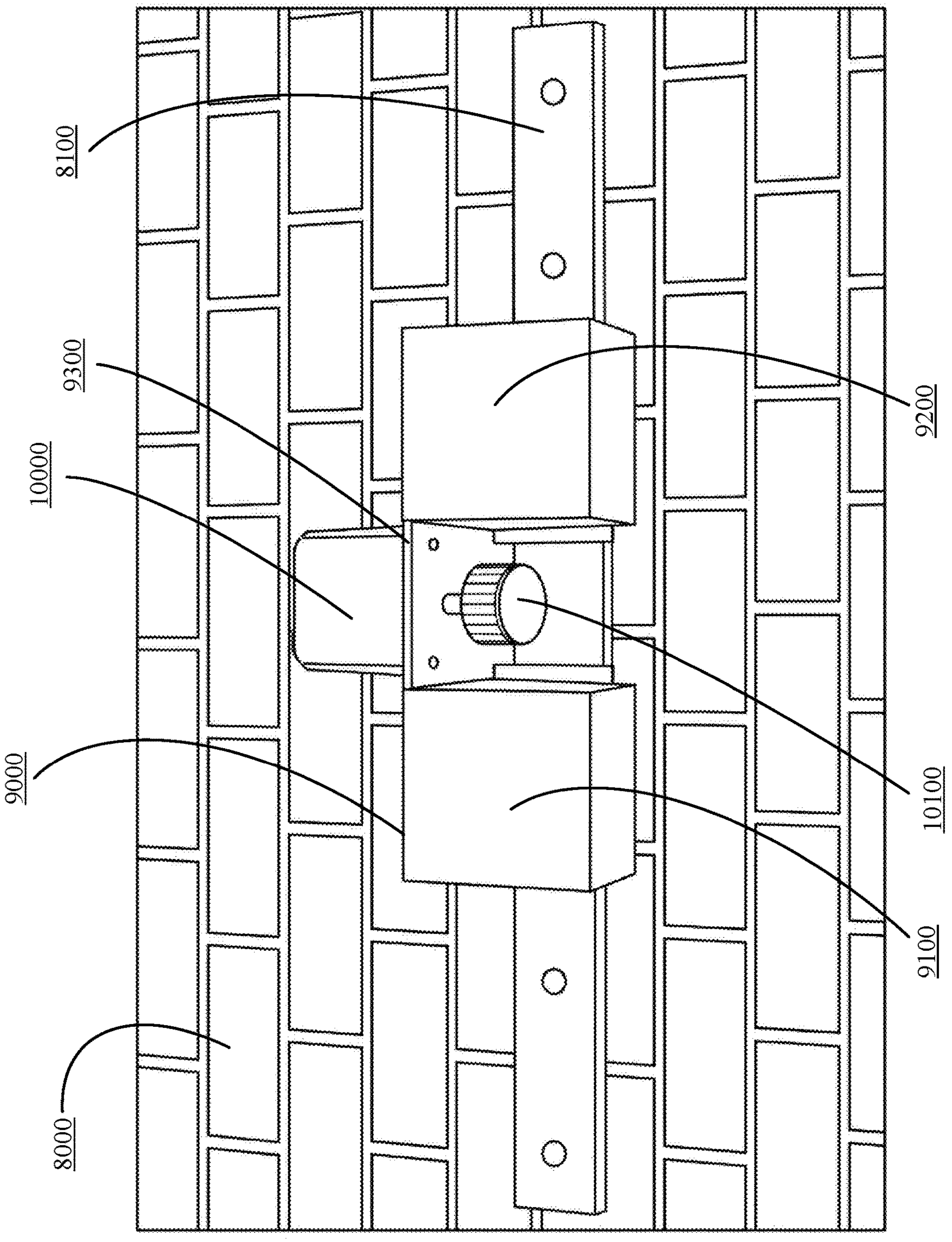
FIG. 10 is a diagram of an example of a stepper motor with a rubber wheel mounted to the mounting bracket of FIG. 9 in accordance with embodiments of this disclosure.
Figure 11:
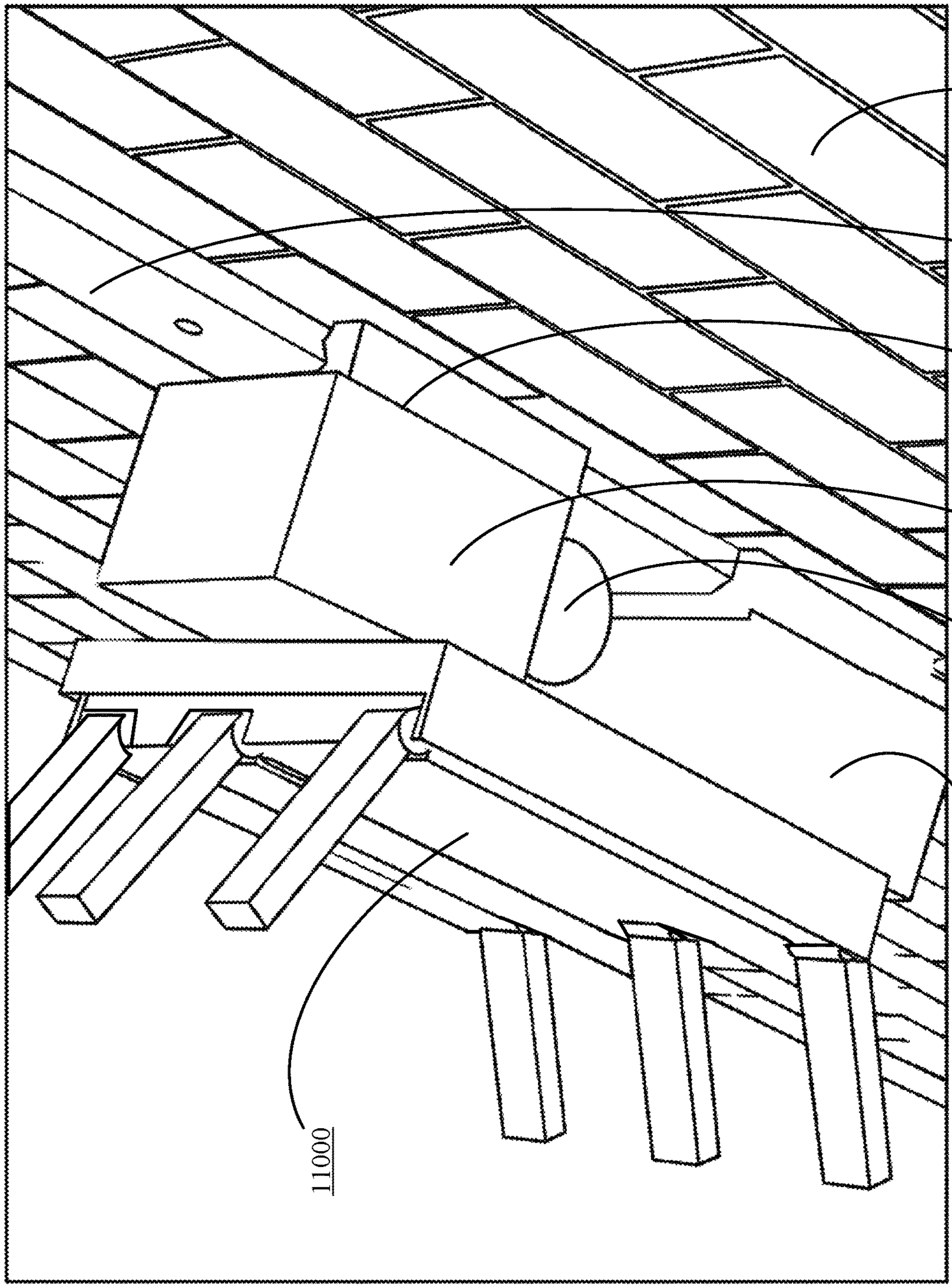
FIG. 11 is a diagram of an example of a wireless router mounted to the mounting bracket of FIG. 9 in accordance with embodiments of this disclosure.
Figure 12:
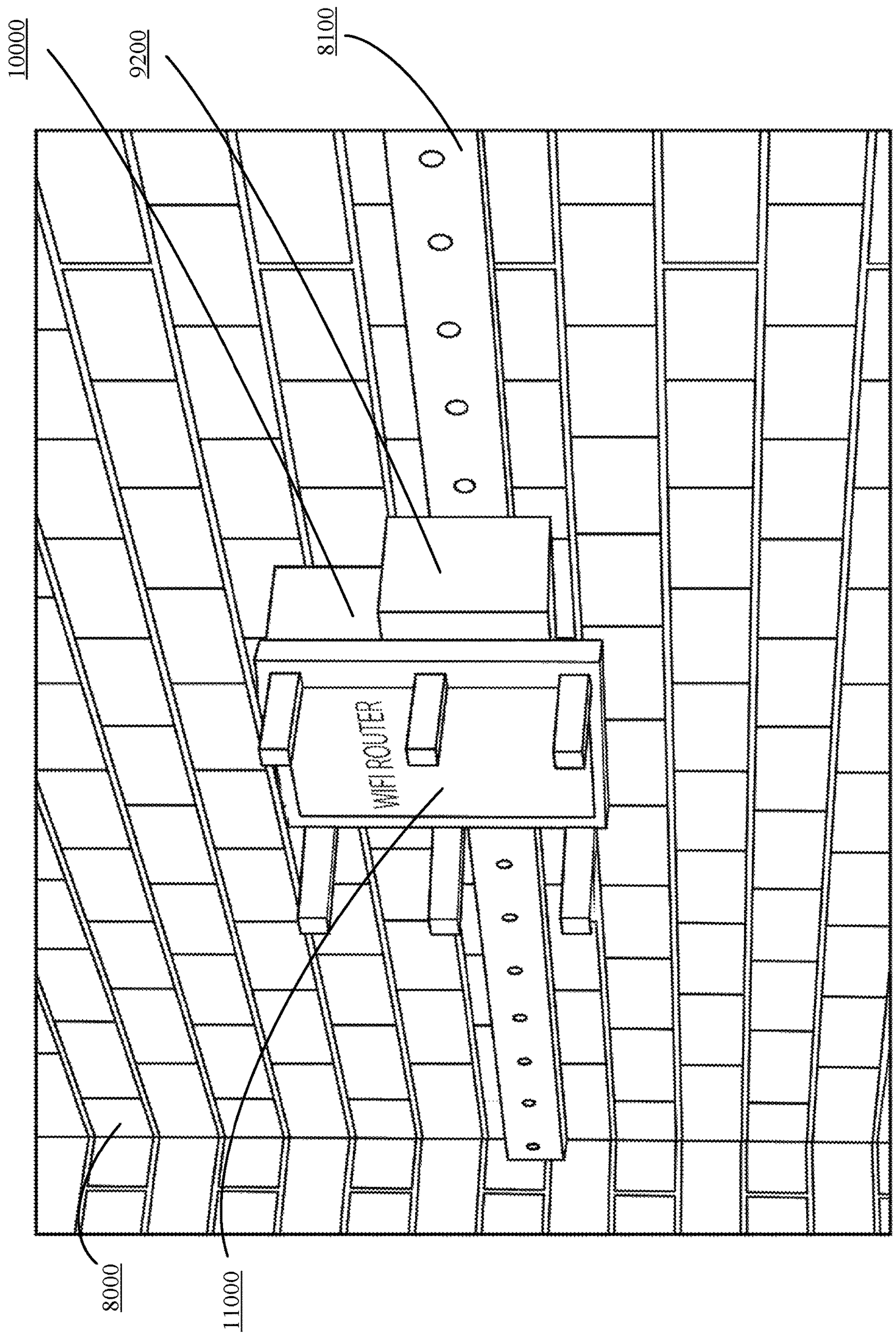
FIG. 12 is a perspective view of the assembled device of FIG. 11 in accordance with embodiments of this disclosure.

FIGS. 8-12 are diagrams of examples of placing a wireless router on a mechanized device for automated wireless router optimal positioning. FIG. 8 is a diagram of an example of a linear rail with sliders mounted to a wall in a premises in accordance with embodiments of this disclosure. FIG. 9 is a diagram of an example of a mounting bracket mounted to the sliders of FIG. 8 in accordance with embodiments of this disclosure. FIG. 10 is a diagram of an example of a stepper motor with a rubber wheel mounted to the mounting bracket of FIG. 9 in accordance with embodiments of this disclosure. FIG. 11 is a diagram of an example of a wireless router mounted to the mounting bracket of FIG. 9 in accordance with embodiments of this disclosure. FIG. 12 is a perspective view of the assembled device of FIG. 11 in accordance with embodiments of this disclosure.

A premises 8000 can include one or more walls for placement of a wireless router 11000. In implementations, the premises can be, but is not limited to, an office, a building, a home, a factory, a store, a stadium, and/or an event center which can include ceilings, walls, and/or other surfaces (collectively "walls") on which a linear rail 8100 can be mounted or attached thereto. A pair of sliders 8200 can be slidably mounted to the linear rail 8100. A mounting bracket 9000, namely slider mounting bracket 9100 and 9200, is attached to the pair of sliders 8200. The mounting bracket 9000 can include a stepper motor mounting section 9300 which connects the slider mounting brackets 9100 and 9200. The stepper motor mounting section 9300 can include mounting holes or apertures 9400 for attaching a stepper motor 10000. The stepper motor mounting section 9300 can also include an aperture 9500 for placement of a moving mechanism, such as a rubber wheel 10100. The wireless router 11000 can then be connected to the mounting bracket 9000 and electrically connected to the stepper motor 10000. The wireless router 11000, the linear rail 8100, the pair of sliders 8200, the mounting bracket 9000, the slider mounting brackets 9100 and 9200, the stepper motor mounting section 9300, the mounting holes or apertures 9400, the aperture 9500, the stepper motor 10000, and the rubber wheel 10100 include the structural, operational, and functional descriptions described herein with respect to FIGS. 1-7.

Operationally, with respect to FIGS. 1-7 and/or 8-12, the linear rail 2000 (8100) is attached to a wall on the premises. In implementations, the linear rail 2000 (8100) can be positioned vertically and/or horizontally on the wall. In implementations, multiple linear rails can be used. In implementations, an array of linear rails can be used. In this instance, an appropriately configured digital actuator and moving mechanism can be used to enable positioning on the array. The remaining components of the automated position optimization system 6000, including the wireless router 1000 (11000) being mechanically and electrically attached (collectively "operationally attached") to the mounting bracket 4000 (9000) and the stepper motor 5000 (10000), can be attached to the linear rail 2000 (8100) via the sliders 3000 (8200).

Upon powering on and boot-up of the wireless router 1000 (11000), the wireless router 1000 (11000) can initiate a search, homing, or initiation cycle (collectively "search cycle") as needed. In the event the search cycle is needed, the controller 1200 can command the moving of the wireless router 1000 (11000) to one side of the linear rail 2000 (8100). During the search cycle, the wireless router 1000 (11000) can measure and store (as appropriate), signal connectivity data, such as but not limited to packet loss and RSSI data, for all or designated connected devices starting at one end of the linear rail 2000 or at a starting point on the linear rail 2000 (8100). During the search cycle, the wireless router 1000 (11000) can aggressively ping the connected devices to generate synthetic traffic. In implementations, the connected devices can have an application installed to generate synthetic traffic for a more accurate search cycle. The controller 1200 can command movement of the wireless router 1000 (11000) at a defined rate toward the other end of the linear rail 2000 or over a remaining points on the linear rail 2000 (8100). In implementations, the defined rate can be configured by the user. In implementations, the defined rate can be set to 1 mm/s-5 mm/s. In implementations, the defined rate can be set to have sufficient time to obtain the signal connectivity data at a position on the linear rail 2000 (8100). The controller 1200 can command movement of the wireless router 1000 (11000) to a position on the linear rail 2000 (8100) that optimizes the signal connectivity for all or designated connected devices. Optimization can be with respect to minimizing packet loss, maximizing RSSI, and/or combinations thereof. In implementations, optimization can be performed or determine using one or more techniques such as, but not limited to, averaging signal connectivity data at each position, using minima and maxima criteria, and the like.

In implementations, the wireless router 1000 (11000) can maintain a whitelist of connected devices which are subscriber or customer connected devices in contrast to guest devices. In this instance, optimization is favored toward frequent users of the wireless router 1000 (11000). In implementations, the whitelist can be maintained in the memory 1300. In implementations, the whitelist can be updated as appropriate.

In implementations, the wireless router 1000 (11000) can maintain a blacklist of connected devices which are to be ignored from optimization considerations. In this instance, connected devices which are occasionally used can be discounted or ignored during search cycles. In implementations, the blacklist can be maintained in the memory 1300. In implementations, the blacklist can be updated as appropriate.

In the event the search cycle is not needed, the controller 1200 can command the moving of the wireless router 1000 (11000) to a previously determined optimal position on the linear rail 2000 (8100). Once at a previously determined optimal position, the wireless router 1000 (11000) can initiate one or more search cycles based on signal connectivity data. In implementations, the search cycle can be manually started by a user.

Once at a previously determined optimal position, the wireless router 1000 (11000) can measure and store (as appropriate), signal connectivity data from the connected devices, as appropriate. If one or more of the signal connectivity data is deficient, the wireless router 1000 (11000) can initiate the search cycle as described herein. In implementations, the wireless router 1000 (11000) can initiate the search cycle (as described herein) if the packet loss data or value is greater than a defined packet loss threshold. That is, there are too many packets losing data. In implementations, the defined packet loss threshold can be configured by the user, subscriber, and/or customer. In implementations, the wireless router 1000 (11000) can initiate the search cycle (as described herein) if the RSSI value of data is less than or equal to a defined RSSI threshold. In implementations, the defined RSSI threshold can be configured by the user, subscriber, and/or customer.

Figure 13:
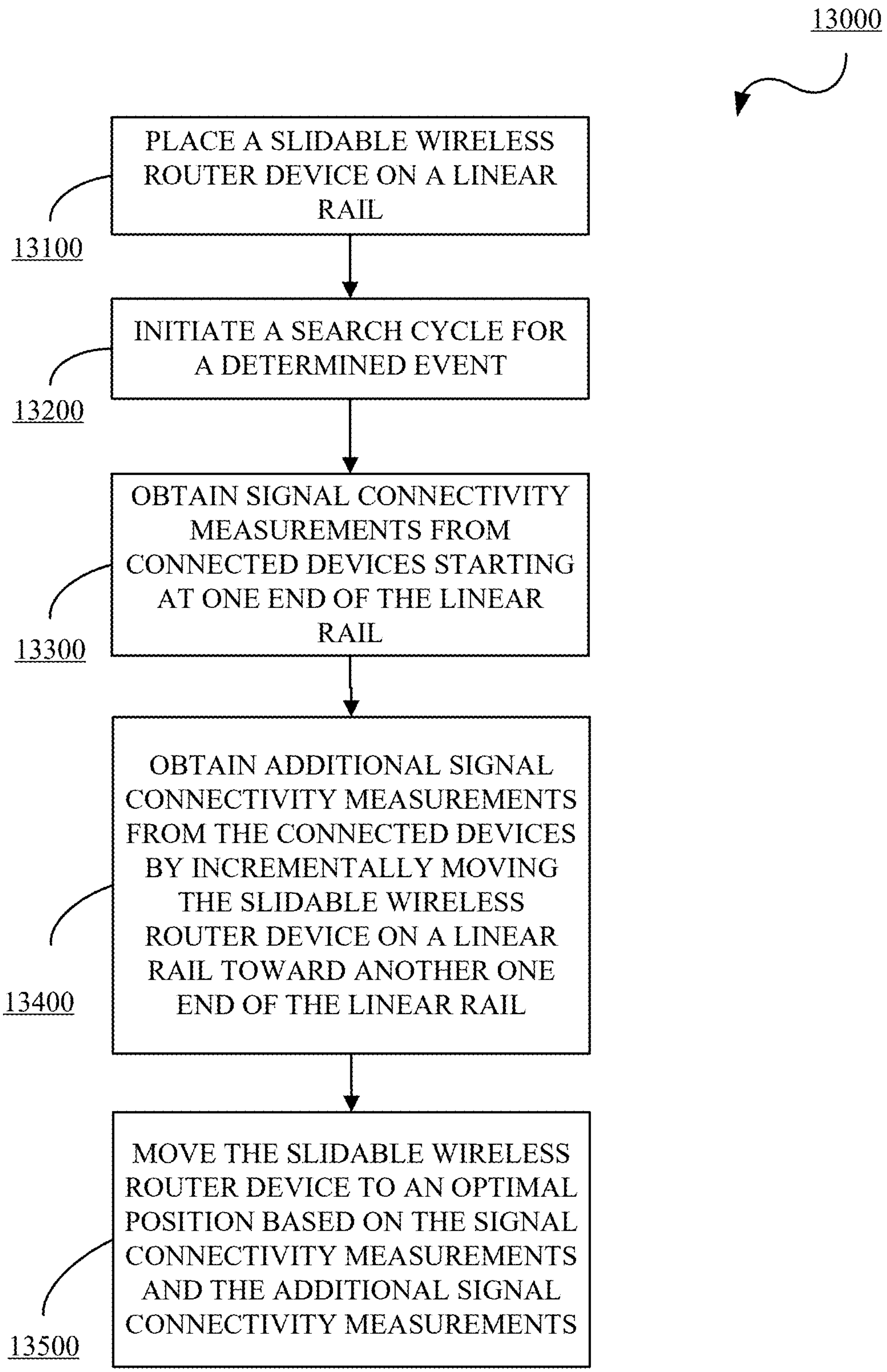
FIG. 13 is a flowchart of an example method for automated wireless router positioning in accordance with embodiments of this disclosure.

FIG. 13 is a flowchart of an example method 13000 for automated wireless router positioning in accordance with embodiments of this disclosure. The method 13000 includes: placing 13100 a slidable wireless router device on a linear rail; initiating 13200 a search cycle for a determined event; obtaining 13300 signal connectivity measurements from connected devices starting at one end of the linear rail or at a starting point on the linear rail; obtaining 13400 additional signal connectivity measurements from the connected devices by incrementally moving the slidable wireless router device on a linear rail toward another one end of the linear rail or over remaining points on the linear rail; and moving 13500 the slidable wireless router device to an optimal position based on the signal connectivity measurements and the additional signal connectivity measurements. The method 13000 can be implemented, for example, in or by components described with respect to FIGS. 1-12 and 14, as appropriate and applicable.

The method 13000 includes placing 13100 a slidable wireless router device on a linear rail. The slidable wireless router device can be assembled as described herein with respect to FIGS. 1-12. The slidable wireless router device can include a wireless router.

The method 13000 includes initiating 13200 a search cycle for a determined event. The wireless router of the slidable wireless router device can be powered. If the wireless router has been used in the premises before, the slidable wireless router device can be moved to a previously determined optimal position. During its stay at the previously determined optimal position, if updated signal connectivity measurements are deficient (a determined event), a search cycle can be initiated. If the wireless router has not been used in the premises before (a determined event), then the search cycle is initiated. A search cycle can also be manually initiated (a determined event). For the search cycle, the slidable wireless router device is moved to one end of the linear rail or starts where it is as a starting point.

The method 13000 includes obtaining 13300 signal connectivity measurements from connected devices starting at one end of the linear rail or at a starting point and obtaining 13400 additional signal connectivity measurements from the connected devices by incrementally moving the slidable wireless router device on a linear rail toward another one end of the linear rail or by moving the slidable wireless router device over remaining point on the linear rail. The wireless router can obtain and/or collect signal connectivity measurements from connected devices starting at one end (or a starting point) and as it moves toward the other end of the linear rail or over the remaining points on the linear rail. The connected devices can be all devices connected to the wireless router, designated connected devices, whitelisted connected devices, exclusion of blacklisted devices, and/or combinations thereof.

The method 13000 includes moving 13500 the slidable wireless router device to an optimal position based on the signal connectivity measurements and the additional signal connectivity measurements. The signal connectivity measurements can be analyzed by the wireless router, a controller, and/or combinations thereof. The controller can command movement or positioning of the slidable wireless router device to an optimal position. In implementations, the wireless router can continue to collect signal connectivity measurements from the connected devices. If a deficiency with respect to a signal connectivity threshold is determined, a search cycle can be initiated (another defined event).

Figure 14:
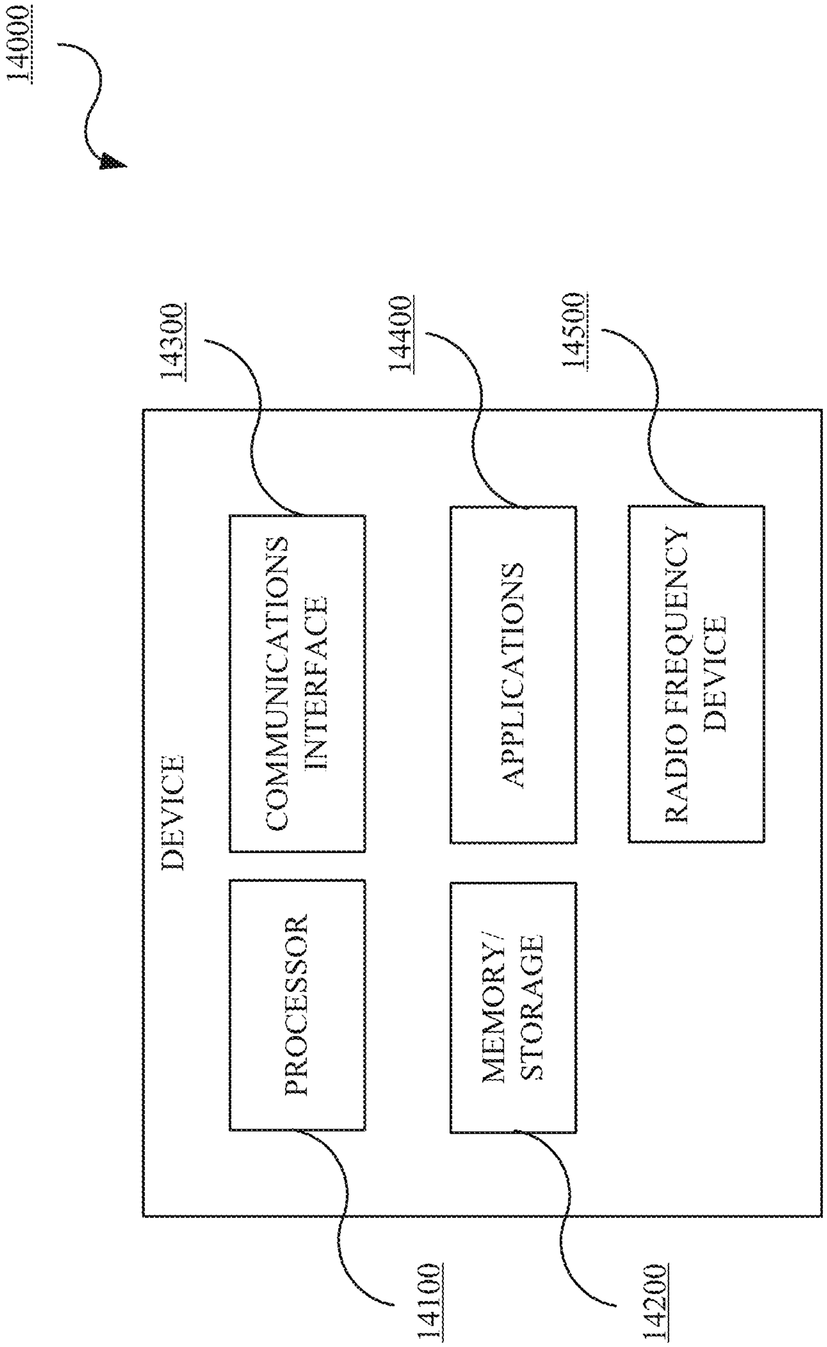
FIG. 14 is a block diagram of an example of a device in accordance with embodiments of this disclosure.

FIG. 14 is a block diagram of an example of a device 14000 in accordance with embodiments of this disclosure. The device 14000 may include, but is not limited to, a processor 14100, a memory/storage 14200, a communication interface 14300, applications 14400, and, if needed, a radio frequency device 14500. The device 14000 may include or implement, for example, the components described with respect to FIGS. 1-13, such as but not limited to, the wireless router and devices to be connected to the wireless router. The application 14400 can include a synthetic traffic generating application. The applicable or appropriate flows, techniques, or methods described herein may be stored in the memory/storage 14200 and executed by the processor 14100 in cooperation with the memory/storage 14200, the communications interface 14300, the applications 14400, and the radio frequency device 14500 (when applicable), as appropriate. The device 14000 may include other elements which may be desirable or necessary to implement the devices, systems, and methods described herein. However, because such elements and steps do not facilitate a better understanding of the disclosed embodiments, a discussion of such elements and steps may not be provided herein.

Described herein are methods for automated wireless router positioning. In implementations, the method includes placing a slidable wireless router device on a linear rail attached to a wall, initiating, by a wireless router in the slidable wireless router device, a search cycle for a determined event, obtaining, by the wireless router from connected devices, signal connectivity measurements starting at one end of the linear rail, obtaining, by the wireless router from the connected devices, additional signal connectivity measurements by incrementally moving the slidable wireless router device on the linear rail toward another one end of the linear rail, and moving, by a controller in the slidable wireless router device, the slidable wireless router device to an optimal position on the linear rail based on the signal connectivity measurements and the additional signal connectivity measurements.

In implementations, the method further includes moving, by the controller, the slidable wireless router device to a previously determined optimal position when available. In implementations, the method further includes obtaining, by an optimally positioned wireless router from the connected devices, updated signal connectivity measurements, and initiating, by the wireless router and the controller, a search cycle when a signal connectivity measurement is deficient. In implementations, the signal connectivity measurement is packet loss measurement and the packet loss measurement is deficient when the packet loss measurement is greater than a defined packet loss threshold. In implementations, the signal connectivity measurement is received signal strength indicator (RSSI) measurement and the RSSI measurement is deficient when the RSSI measurement is equal to or less than a defined RSSI threshold. In implementations, the connected devices are those on a configurable whitelist. In implementations, the method further includes the connected devices on a configurable blacklist are ignored. In implementations, the method further includes the optimal position is based on at least one of minimization of packet loss for the connected devices and maximization of received signal strength indicator for the connected devices. In implementations, the signal connectivity measurements and the additional signal connectivity measurements are based on synthetic traffic generated by the connected devices. In implementations, the method further includes controlling, by the controller a stepper motor in the slidable wireless router device, to position the slidable wireless router device at the optimal position on the linear rail.

Described herein is a wireless router device for automated wireless router positioning. In implementations, the wireless router device includes a slidable mechanism configured to connect to a linear rail mounted on a surface in a premises, and a wireless router configured to be operationally connected to the slidable mechanism. The wireless router configured to collect signal connectivity data from connected devices starting at one end of the linear rail upon an occurrence of a defined event, collect further signal connectivity data from connected devices as the slidable mechanism incrementally moves toward another one end of the linear rail, and locate the slidable mechanism to an optimal position on the linear rail based on the signal connectivity data and the further signal connectivity data.

In implementations, the wireless router is further configured to locate the slidable mechanism to a previously determined optimal position on the linear rail. In implementations, the wireless router is further configured to collect updated signal connectivity data at a previously determined optimal position on the linear rail, and initiate a search cycle when a signal connectivity data is deficient. In implementations, the signal connectivity data is packet loss measurement and the packet loss data is deficient when the packet loss data is greater than a defined packet loss threshold. In implementations, the signal connectivity data is received signal strength indicator (RSSI) data and the RSSI data is deficient when the RSSI data is equal to or less than a defined RSSI threshold. In implementations, the connected devices are those on a configurable whitelist and the connected devices are ignored when the connected devices are on a configurable blacklist. In implementations, the optimal position is based on at least one of minimization of packet loss for the connected devices and maximization of received signal strength indicator for the connected devices. In implementations, the signal connectivity data and the further signal connectivity data are based on synthetic traffic generated by the connected devices. In implementations, the wireless router further includes a controller connected to a stepper motor having a moving mechanism in contact with the linear rail.

Described herein are methods for automated wireless router positioning. The method includes collecting, by a wireless router from connected devices, signal connectivity data starting at one end of a linear rail upon an occurrence of a defined event, collecting, by the wireless router from the connected devices, further signal connectivity data as a slidable mechanism connected to the wireless router incrementally moves toward another one end of the linear rail, and locating, by the wireless router the slidable mechanism, at an optimal position on the linear rail based on the signal connectivity data and the further signal connectivity data.

Described herein are methods for automated wireless router positioning. The method includes placing a slidable wireless router device on a linear rail attached to a wall, initiating, by a wireless router in the slidable wireless router device, a search cycle for a determined event, obtaining, by the wireless router from connected devices, signal connectivity measurements from a starting point on the linear rail, obtaining, by the wireless router from the connected devices, additional signal connectivity measurements by incrementally moving the slidable wireless router device over remaining points on the linear rail, and moving, by a controller in the slidable wireless router device, the slidable wireless router device to an optimal position on the linear rail based on the signal connectivity measurements and the additional signal connectivity measurements.

Described herein are devices for automated wireless router positioning. A wireless router device includes a slidable mechanism configured to connect to a linear rail mounted on a surface in a premises, and a wireless router configured to be operationally connected to the slidable mechanism. The wireless router configured to collect signal connectivity data from connected devices starting at one point on the linear rail upon an occurrence of a defined event, collect further signal connectivity data from connected devices as the slidable mechanism incrementally moves over other points on the linear rail, and locate the slidable mechanism to an optimal position on the linear rail based on the signal connectivity data and the further signal connectivity data.

Described herein are methods for automated wireless router positioning. A method includes collecting, by a wireless router from connected devices, signal connectivity data starting at one point on a linear rail upon an occurrence of a defined event, collecting, by the wireless router from the connected devices, further signal connectivity data as a slidable mechanism connected to the wireless router incrementally moves across other points on the linear rail, and locating, by the wireless router the slidable mechanism, at an optimal position on the linear rail based on the signal connectivity data and the further signal connectivity data.

Although some embodiments herein refer to methods, it will be appreciated by one skilled in the art that they may also be embodied as a system or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects may take the form of a computer program product embodied in one or more the computer readable mediums having the computer readable program code embodied thereon. For example, the computer readable mediums can be non-transitory. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

As used herein, the term “computer-readable medium” encompasses one or more computer-readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

Computer program code for carrying out operations for aspects may be written in any combination of one or more programming languages, including an object oriented programming language such as Java, Smalltalk, C++ or the like and conventional procedural programming languages, such as the “C” programming language or similar programming languages. The program code may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider).

Aspects are described herein with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for automated wireless router positioning, the method comprising:

placing a slidable wireless router device on a linear rail attached to a wall;

initiating, by a wireless router in the slidable wireless router device, a search cycle for a determined event;

obtaining, by the wireless router from connected devices, signal connectivity measurements from a starting point on the linear rail;

obtaining, by the wireless router from the connected devices, additional signal connectivity measurements by incrementally moving the slidable wireless router device over remaining points on the linear rail; and moving, by a controller in the slidable wireless router device, the slidable wireless router device to an optimal position on the linear rail based on the signal connectivity measurements and the additional signal connectivity measurements.

2. The method of claim 1, further comprising:

moving, by the controller, the slidable wireless router device to a previously determined optimal position when available.

3. The method of claim 1, further comprising:

obtaining, by an optimally positioned wireless router from the connected devices, updated signal connectivity measurements; and initiating, by the wireless router and the controller, a search cycle when a signal connectivity measurement is deficient.

4. The method of claim 3, wherein the signal connectivity measurement is packet loss measurement and the packet loss measurement is deficient when the packet loss measurement is greater than a defined packet loss threshold.

5. The method of claim 3, wherein the signal connectivity measurement is received signal strength indicator (RSSI) measurement and the RSSI measurement is deficient when the RSSI measurement is equal to or less than a defined RSSI threshold.

6. The method of claim 1, wherein the connected devices are those on a configurable whitelist.

7. The method of claim 1, wherein the connected devices on a configurable blacklist are ignored.

8. The method of claim 1, wherein the optimal position is based on at least one of minimization of packet loss for the connected devices and maximization of received signal strength indicator for the connected devices.

9. The method of claim 1, wherein the signal connectivity measurements and the additional signal connectivity measurements are based on synthetic traffic generated by the connected devices.

10. The method of claim 1, further comprising:

controlling, by the controller, a stepper motor in the slidable wireless router device, to position the slidable wireless router device at the optimal position on the linear rail.

11. A wireless router device, comprising:

a slidable mechanism configured to connect to a linear rail mounted on a surface in a premises; and a wireless router configured to be operationally connected to the slidable mechanism, the wireless router configured to:

collect signal connectivity data from connected devices starting at one point on the linear rail upon an occurrence of a defined event;

collect further signal connectivity data from connected devices as the slidable mechanism incrementally moves over other points on the linear rail; and locate the slidable mechanism to an optimal position on the linear rail based on the signal connectivity data and the further signal connectivity data.

12. The wireless router device of claim 11, the wireless router further configured to:

locate the slidable mechanism to a previously determined optimal position on the linear rail.

13. The wireless router device of claim 11, the wireless router further configured to:

collect updated signal connectivity data at a previously determined optimal position on the linear rail; and initiate a search cycle when a signal connectivity data is deficient.

14. The wireless router device of claim 13, wherein the signal connectivity data is packet loss data and the packet loss data is deficient when the packet loss data is greater than a defined packet loss threshold.

15. The wireless router device of claim 13, wherein the signal connectivity data is received signal strength indicator (RSSI) data and the RSSI data is deficient when the RSSI data is equal to or less than a defined RSSI threshold.

16. The wireless router device of claim 15, wherein the connected devices are those on a configurable whitelist and the connected devices are ignored when the connected devices are on a configurable blacklist.

17. The wireless router device of claim 11, wherein the optimal position is based on at least one of minimization of packet loss for the connected devices and maximization of received signal strength indicator for the connected devices.

18. The wireless router device of claim 11, wherein the signal connectivity data and the further signal connectivity data are based on synthetic traffic generated by the connected devices.

19. The wireless router device of claim 11, the wireless router further comprising:

a controller connected to a stepper motor having a moving mechanism in contact with the linear rail.

20. A method for automated wireless router positioning, the method comprising:

collecting, by a wireless router from connected devices, signal connectivity data starting at one point on a linear rail upon an occurrence of a defined event;

collecting, by the wireless router from the connected devices, further signal connectivity data as a slidable mechanism connected to the wireless router incrementally moves across other points on the linear rail; and locating, by the wireless router, the slidable mechanism at an optimal position on the linear rail based on the signal connectivity data and the further signal connectivity data.

* * * * *